US006991021B2

(12) United States Patent
Ramirez et al.

(10) Patent No.: US 6,991,021 B2
(45) Date of Patent: Jan. 31, 2006

(54) PROCESS FOR THE INJECTION OF AN ELECTRIC MOTOR ROTOR

(75) Inventors: Rivio Arturo Ramirez, Joinville-Sc (BR); Edison Krzeminski, Joinville-Sc (BR); Claudio Antonio Drozdek, Joinville-Sc (BR)

(73) Assignee: Empresa Brasileira De Compressores S.A. -Embraco, Joinville--SC (BR)

( * ) Notice: Subject to any disclaimer, the term of this patent is extended or adjusted under 35 U.S.C. 154(b) by 0 days.

(21) Appl. No.: 10/499,491

(22) PCT Filed: Dec. 20, 2002

(86) PCT No.: PCT/BR02/00192

§ 371 (c)(1),
(2), (4) Date: Aug. 3, 2004

(87) PCT Pub. No.: WO03/059553

PCT Pub. Date: Jul. 24, 2003

(65) Prior Publication Data

US 2005/0067130 A1    Mar. 31, 2005

(30) Foreign Application Priority Data

Dec. 28, 2001    (BR) .................................... 106597

(51) Int. Cl.
*B22D 19/00*    (2006.01)
(52) U.S. Cl. ...................... 164/103; 164/105; 164/109; 164/112
(58) Field of Classification Search ................ 164/103, 164/105, 109, 338.1, 112, 312
See application file for complete search history.

(56) References Cited

U.S. PATENT DOCUMENTS

| 1,982,424 A | * | 11/1934 | Fahlman ..................... 164/104 |
| 2,381,616 A | | 8/1945 | Pfleger |
| 5,887,643 A | * | 3/1999 | Nakamura et al. .......... 164/340 |

FOREIGN PATENT DOCUMENTS

| DE | 43 29 679 A1 | 3/1994 |
| EP | 0 772 278 A1 | 5/1997 |
| WO | WO-96/32769 A1 | 10/1996 |

* cited by examiner

*Primary Examiner*—Kevin Kerns
*Assistant Examiner*—I.-H. Lin
(74) *Attorney, Agent, or Firm*—Darby & Darby

(57)    ABSTRACT

A process for the injection of an electric motor rotor, said rotor comprising: a lamination stack (10) having a central axial bore (11) and a plurality of axial channels (12); and a cage (30) of aluminum, which is formed by an upper end ring (31) and a lower end ring (32), which are interconnected by a plurality of bars (33) molten in the axial channels (12). The process comprises the steps of: mounting, at the upper end portion of the central axial bore (11), a stamping pin (40), which has a widened head (41) seated against the upper end lamination of the lamination stack (10); heating the lamination stack, as well as an upper cavity (21) and a lower cavity (22) of a mold (20); positioning the lamination stack (10) inside the mold (20); rotating the mold (20) and pouring the aluminum into the inside thereof through the inlet channel (23); removing, from the mold (20), the rotor (R) with the cage (30) already formed and comprising an upper plate (35) that covers the stamping pin (40); and axially extracting the stamping pin (40) in order to break, centrally, the upper plate (35), transforming it in the upper ring (31) of the cage (30).

4 Claims, 4 Drawing Sheets

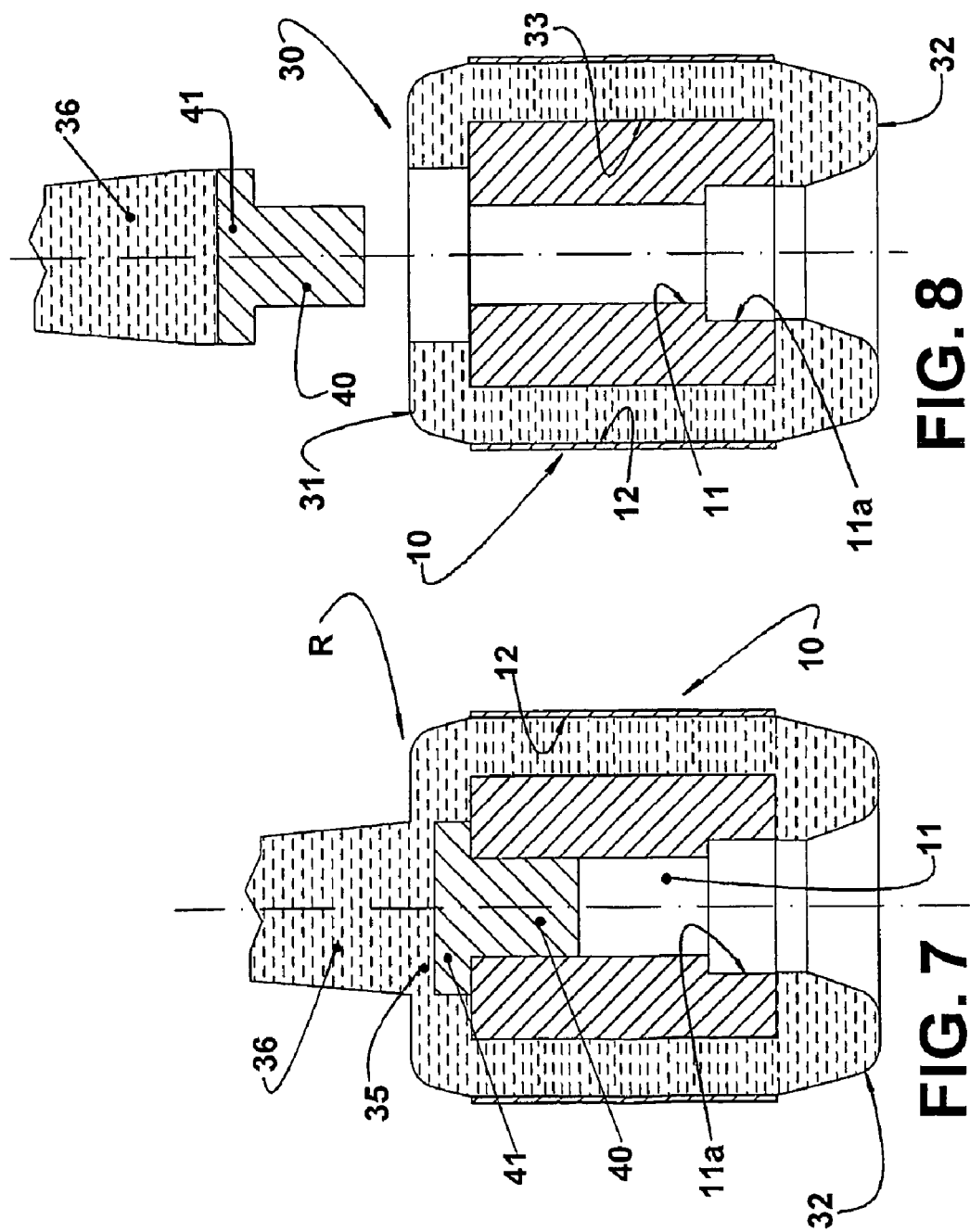

PROCESS FOR THE INJECTION OF AN ELECTRIC MOTOR ROTOR

CROSS-REFERENCE TO RELATED APPLICATION

This application is a 371 of PCT/BR02/00192 filed on Dec. 20, 2002

FIELD OF THE INVENTION

The present invention refers to a process for providing the injection, by centrifugation, of the cage made of aluminum, or other adequate metal, into the stack of steel laminations of the rotor of an electric motor, particularly the rotor of small electric motors, such as those used in the hermetic compressors of small refrigeration systems.

BACKGROUND OF THE INVENTION

It is already known from the prior art the injection, by centrifugation, of the aluminum cages in rotors, which are formed by a stack of overlapped identical annular steel laminations provided with openings that are longitudinally aligned with the openings of other laminations of the stack, in order to define a plurality of axial channels interconnecting the external faces of the end laminations of the stack and which are angularly spaced from each other along a circular alignment, which is concentric to the longitudinal axis of the lamination stack, but radially spaced back in relation to the lateral face of the latter.

As illustrated in FIGS. 1–5 representative of the state of the art, the lamination stack 10, with the vertically disposed longitudinal axis, is positioned inside a mold 20, which defines a lower annular cavity 22 close to the external face of the lower end lamination, and an upper cavity 21, which is substantially cylindrical or frusto-conical, close to the external face of the upper end lamination and opened to the inlet channel 23 for the admission of aluminum into the mold 20.

During the pouring of the aluminum or of the selected metallic alloy, the lamination stack 10 has its central axial bore 11, into which will be later mounted the shaft of the electric motor, filled with a core 25, having an upper end substantially leveled with the upper end lamination of the lamination stack 10, and having a widened lower end portion seated on a respective lower end widening 11a of the central axial bore 11 of the lamination stack 10 and against the mold that defines the lower cavity 22.

The aluminum is poured into the upper cavity 21, passing through the axial channels 12 of the lamination stack 10 to the lower cavity 22, filling the latter, the axial channels 12, and the upper cavity 21, in this order, and solidifying in a radial inward upward pattern, as the mold 20 rotates around its vertical axis and the metal cools.

Upon completion of the aluminum pouring and solidification, the mold 20 is opened and the formed rotor is submitted to machining operations, in order to eliminate a projection 36 that has solidified in the inlet channel 23 (FIG. 4) and, subsequently, the aluminum plate that has molten against the upper end lamination of the lamination stack 10, in order to unobstruct the adjacent end of the central axial bore 11 of the lamination stack 10, and to define the correct internal profile for the upper ring 31 of the aluminum cage, which further comprises, in a single piece, a lower ring 32 already formed by the mold 20, and a plurality of bars 33 formed inside the axial channels 12 of the lamination stack 10.

In the centrifugation injection of these rotors, the upper cavity 21 and the lower cavity 22 of the mold 20 and the lamination stack 10 itself are heated, so that the molten aluminum passes through the upper cavity 21 and through the axial channels 12 of the lamination stack 10 without solidifying, gravitationally reaching the lower cavity 22, filling the latter and starting to solidify from the outside to the inside and from the bottom upwardly. Therefore, the upper cavity 21 and the lamination stack 10 are usually heated at a temperature much lower than the melting temperature of the aluminum, while the lower cavity 22 is heated at a lower temperature, allowing the aluminum to be solidified lastly at the hottest upper region of the mold 20. In order that the air existing in both the upper cavity 21 and the lower cavity 22, and in the axial channels 12 be conducted outwardly from the mold by the aluminum supplied to said mold, the lower cavity 22 is provided with an air outlet of any adequate construction (not illustrated).

As illustrated in FIGS. 1–5, the pouring of the aluminum into the mold 20 is effected through the inlet channel 23 and to the interior of the upper cavity 21, whose lower wall is defined by the upper end lamination of the lamination stack 10, and by the upper end of the rod 25 introduced in the central axial bore 11 of the lamination stack 10.

However, the liquid aluminum poured into the upper cavity 21 comes into direct contact with the internal marginal region of the upper end lamination of the lamination stack 10, which causes deformations in this region and allows the aluminum to penetrate between the upper laminations of the lamination stack 10.

Besides requiring extensive machining operations to form the upper ring 31, this prior art injection process requires a difficult machining of the central region of the upper ring 31 in order to adapt the oil pump of the compressor, due to the deformation of the upper end lamination in the uncovered central region of the upper ring 31. These machining operations reduce the productivity and increase the production cost of the rotors, particularly the rotors of small dimensions with a large volume of production. Furthermore, the penetration of aluminum between the laminations radially outwardly from the upper end region of the central axial bore 11 impairs the electromagnetic efficiency of the rotor.

OBJECT OF THE INVENTION

By reason of the above-mentioned problems related to the process for injecting rotors by centrifugation, it is the object of the present invention to provide a process for injecting these parts by centrifugation, which considerably reduces the machining operations to form the upper ring of the cage made of aluminum or other conductive material of the rotor, and eliminates the problem of deformation of the upper end lamination and consequently the penetration of aluminum between the upper laminations of the lamination stack.

SUMMARY OF THE INVENTION

Aiming at attaining the above-mentioned objective, the injection process of the present invention is applied to obtain a rotor comprising: a lamination stack provided with a central axial bore and a plurality of axial channels; and a cage, which is made of molten metal and formed by an upper end ring and by a lower end ring, which are respectively seated against the upper and lower end laminations of the lamination stack, and interconnected, in a single piece, by a plurality of bars that are molten in the axial channels.

According to the invention, the injection process of the cage comprises the steps of:

filling the lower end of the central axial bore with a respective core; mounting, at the upper end portion of the central axial bore, a stamping pin, which has a widened head seated against the upper end lamination of the lamination stack and presents a circular contour with a diametrical cross section that defines part of the height of the diametrical cross section of the central opening of the upper ring of the cage;

heating the lamination stack at a first temperature that is lower than the melting temperature of the metal to be injected;

heating, at said first temperature, an upper cavity of a mold to be positioned close to the upper end lamination of the lamination stack and, at a second temperature, substantially lower than the first, a lower cavity of the mold to be positioned close to the lower end lamination of the lamination stack;

positioning the lamination stack, with its vertically disposed longitudinal axis, inside the mold;

rotating the mold and pouring the metal therein, through the inlet channel, in order to fill the lower cavity, the axial channels, and the upper cavity;

allowing the metal to solidify, stopping the mold and opening it to remove the rotor and the core from the interior thereof, with the cage already formed and comprising the lower ring, the bars, and an upper plate that covers the stamping pin; and axially extracting the stamping pin, in order to break, centrally, the upper plate, transforming it in the upper ring of the cage.

As it can be noted, the present process eliminates the harmful effects of the liquid metal contacting, at a high temperature, the exposed central portion of the upper end lamination, as well as the necessity of machining a large quantity of aluminum to form the central opening of the upper ring of the cage. The removal of the stamping pin causes the rupture of the upper plate of the metal, practically defining the central opening of the upper ring of the cage and only requiring, if needed, a slight machining (chamfering) for the finishing of the sharp edge to eliminate the barbs originated from the extraction of the stamping pin.

BRIEF DESCRIPTION OF THE DRAWINGS

The invention will be described below, with reference to the enclosed drawings, in which:

FIG. 7 is a view similar to that of FIG. 3, but illustrating the rotor as extracted from the mold and released from the lower core, according to a further step of the new process; and FIG. 8 is a view similar to that of FIG. 7, but illustrating the step of removing the stamping pin, in order to form the central opening of the upper ring of the cage.

DETAILED DESCRIPTION OF THE INVENTION

Figure 2:
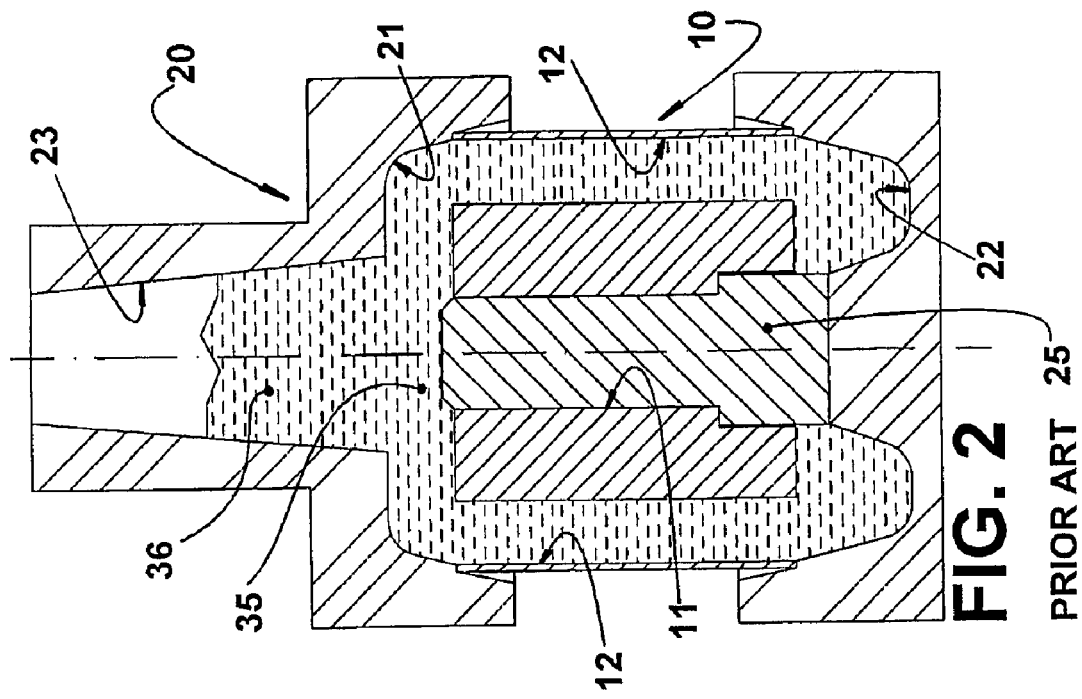
FIG. 2 is a view similar to that of FIG. 1, but illustrating the lamination stack already carrying the cage formed in the interior of the two cavities of the mold, and in the axial channels of the lamination stack.
Figure 1:
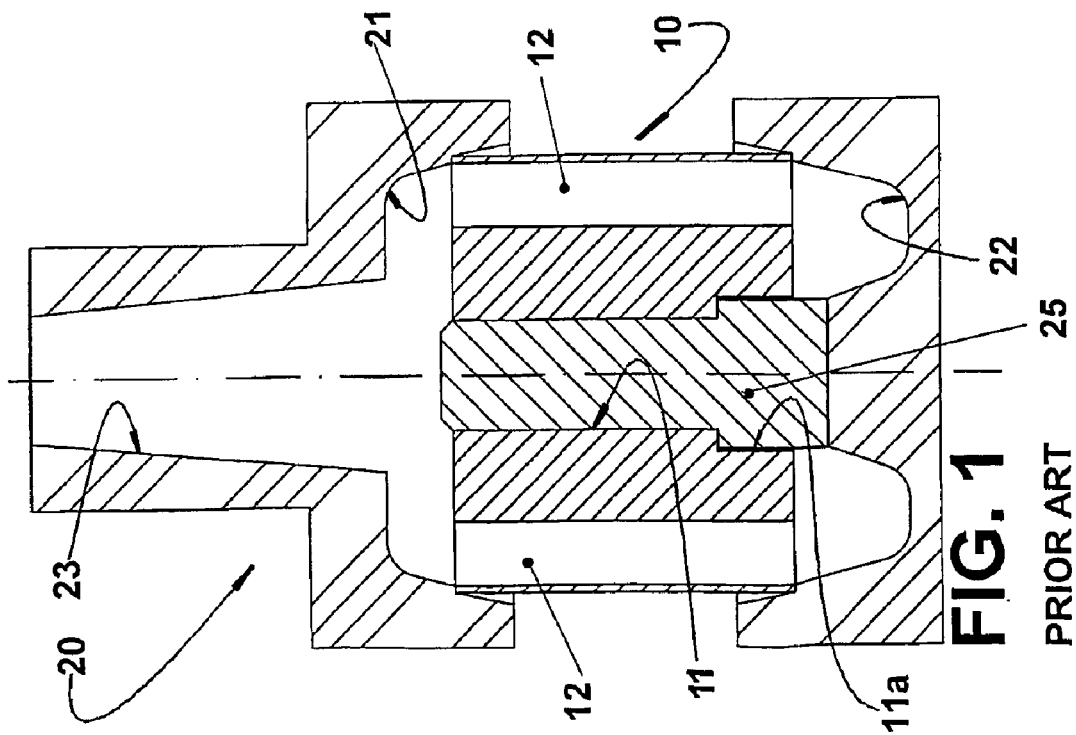
FIG. 1 is a diametrical longitudinal sectional view of a lamination stack mounted inside a mold, for the subsequent injection of aluminum or other metal by centrifugation, according to a prior art process.
Figure 3:
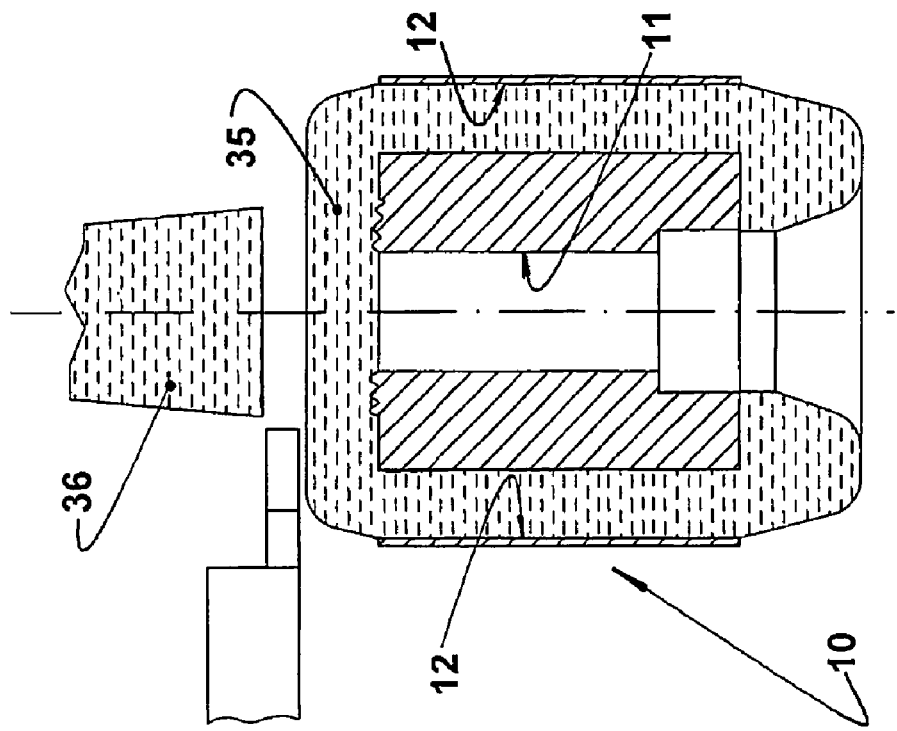
FIG. 3 is a longitudinal sectional view of the rotor obtained by the prior art process and after it has been removed from the mold illustrated in FIG. 2, said view further illustrating the deformation that usually occurs in the upper end lamination of the lamination stack.

As already mentioned, in the process of injection by centrifugation shown in FIGS. 1–5, the injection of liquid aluminum (or other metal) into the upper cavity is directly made over the whole external annular surface of the upper end lamination of the lamination stack 10, producing deformations on said surface. Besides the problem above, the upper cavity 21 of the mold 20 is configured to provide the melting of a plate 35, incorporating an upper axial projection 36 defined inside the inlet channel 23, and which is partially used to compensate the contraction of the aluminum during the solidification.

Figure 4:
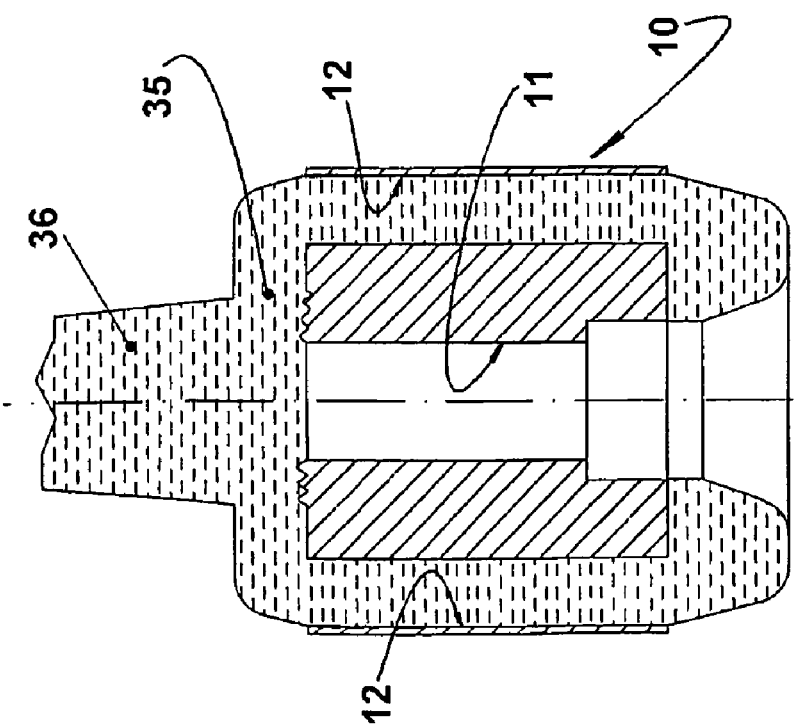
FIGS. 4–5 are views similar to that of FIG. 3, but illustrating two machining operations that the prior art requires to form the upper ring of the cage.
Figure 6:
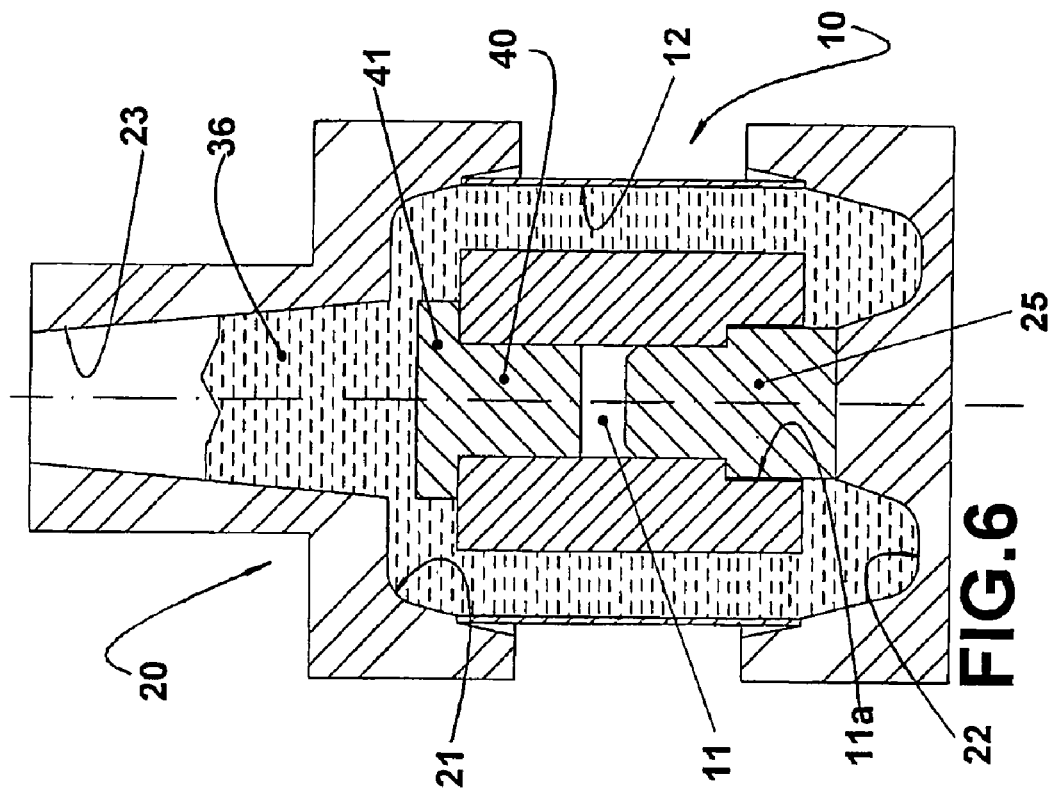
FIG. 6 is a view similar to that of FIG. 2, but illustrating the cage injected in the lamination stack, according to the process of the present invention.
Figure 5:
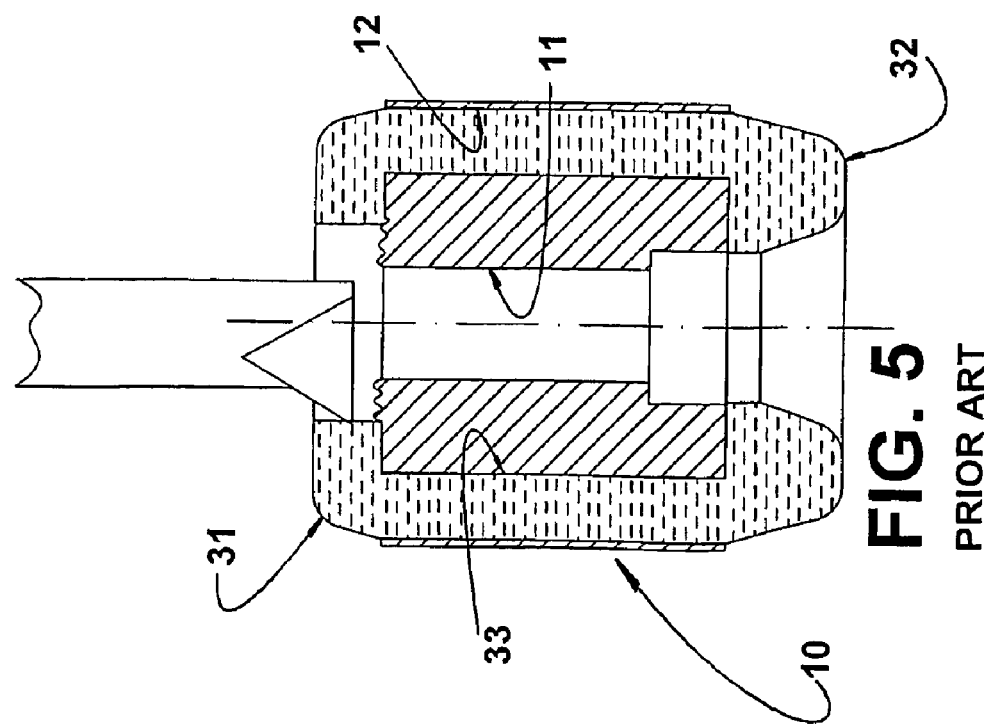

This solution requires the machining operations schematically illustrated in FIGS. 4–5.

According to the process of the present invention, the lamination stack 10 has the lower end widening 11a of the central axial bore 11 filled with a respective core 25, which is fitted inside part of the extension of the central axial bore 11 of the lamination stack 10.

In the upper end portion of the central axial bore 11 is fitted a stamping pin 40, which presents a widened head 41 of circular contour, seated on the upper end lamination of the lamination stack 10. The widened head 41 of the stamping pin 40 is dimensioned so that its diametrical cross section coincides with the diametrical cross section of the central opening of the upper ring 31 of the cage 30.

The lamination stack 10 thus prepared is heated at an adequate temperature, generally quite lower than that of the melting point of the aluminum, and positioned inside the mold 20, whose upper cavity 21 is previously heated generally at the same temperature of the lamination stack 10, and the lower cavity 22 is previously heated at a lower heating temperature of the upper cavity.

The lamination stack 10 is mounted inside the mold 20 with its longitudinal axis being vertically disposed, and then the mold 20 is rotated around its axis, while the molten aluminum is poured through the inlet channel 23 into the interior of the upper and lower cavities 21, 22 and into the axial channels 12 of the lamination stack 10.

After the cavities 21 and 22 of the mold 20 and the axial channels 12 of the lamination stack have been filled, the aluminum starts its process of solidification from the outside to the inside, while the mold remains rotating.

When the solidification of the aluminum is completed, the mold is immobilized and opened for removing the rotor R from the interior thereof, and so that the core 25 can be drawn from the inside of the lamination stack 10. The injected rotor R comprises the lower ring 32 of the cage 30, the bars already shaped, and an upper plate that covers the widened head 41 of the stamping pin 40, and incorporating the upper axial projection 36, as illustrated in FIG. 8.

The dimensioning of the head 41 of the stamping pin 40 is made so as to define, with the upper cavity 21 of the mold 20, an annular passage, which is sufficient for the liquid aluminum to flow toward the axial channels 12, but focusing this peripheral region, in which the plate 35 joins the axial projection 36.

This construction allows, when the stamping pin 40 is axially outwardly forced, the upper plate 35 to be ruptured around the peripheral edge of the widened head 41. Thus, the axial extraction of the stamping pin 40 causes the formation of the central opening of the upper ring 31 of the cage 30, without requiring machining operations for removing large quantities of aluminum.

In general, only a slight internal machining of the upper ring 31 is required, which is characterized as a chamfering operation to eliminate the barbs originated from the extraction (stamping) of the aluminum during the extraction of the pin.

It should be understood that the previous heating temperatures of the mold cavities and of the lamination stack can vary, according to other parameters involved in the process, provided that the heating of the lower cavity is inferior to that imposed to the upper cavity and to the lamination stack.

What is claimed is:

1. A process for the manufacture of an electric motor rotor, said rotor comprising: a lamination stack, which is provided with a central axial bore and a plurality of axial channels; and a cage formed by an upper end ring and a lower end ring, which are respectively seated against the upper and lower end laminations of the lamination stack, and interconnected, in a single piece, by a plurality of bars in the axial channels, comprising the steps of:

filling the lower end of the central axial bore with a respective core;

mounting, at the upper end portion of the central axial bore, a stamping pin, which has a widened head seated against the upper end lamination of the lamination stack and presents a circular contour with a diametrical cross section coinciding with the diametrical cross section of the central opening of the upper ring of the cage;

heating the lamination stack at a first temperature that is lower than the melting temperature of a metal to be injected;

heating, at said first temperature, an upper cavity of a mold, to be positioned close to the upper end lamination of the lamination stack and, at a second temperature substantially lower than the first temperature, a lower cavity of the mold, to be positioned close to the lower end lamination of the lamination stack;

positioning the lamination stack, with its vertically disposed longitudinal axis, inside the mold;

rotating the mold and pouring the molten metal to the inside thereof through an inlet channel, in order to fill the lower cavity, the axial channels, and the upper cavity;

solidifying the metal, stopping the mold and opening it to remove the rotor and the core from the inside thereof, with the cage already formed and comprising the lower ring, the bars, and an upper plate that covers the stamping pin; and axially extracting the stamping pin in order to break, centrally, the upper plate, transforming the upper plate into the upper ring of the cage.

2. The process, according to claim 1, further comprising the step of internally machining the upper ring to the final form.

3. The process, according to claim 2, wherein the metal is aluminum and that the first temperature for heating the lamination stack and the upper cavity of the mold is much lower than the melting temperature of the aluminum, whereas the second temperature for heating the lower cavity of the mold is much lower than that for heating the upper cavity.

4. The process, according to claim 1, wherein the metal is aluminum and that the first temperature for heating the lamination stack and the upper cavity of the mold is much lower than the melting temperature of the aluminum, whereas the second temperature for heating the lower cavity of the mold is much lower than that for heating the upper cavity.

* * * * *

UNITED STATES PATENT AND TRADEMARK OFFICE
CERTIFICATE OF CORRECTION

PATENT NO. : 6,991,021 B2
DATED : January 31, 2006
INVENTOR(S) : Rivio Arturo Ramirez et al.

It is certified that error appears in the above-identified patent and that said Letters Patent is hereby corrected as shown below:

<u>Title page,</u>
Item [54], Title, delete "PROCESS FOR THE INJECTION OF AN ELECTRIC MOTOR ROTOR" and substitute with -- PROCESS FOR THE MANUFACTURE OF AN ELECTRIC MOTOR ROTOR --.

Signed and Sealed this

Twenty-third Day of May, 2006

JON W. DUDAS
*Director of the United States Patent and Trademark Office*